United States Patent
Harada et al.

(10) Patent No.: US 7,528,798 B2
(45) Date of Patent: May 5, 2009

(54) HEAD-UP DISPLAY DEVICE

(75) Inventors: Takeshi Harada, Shizuoka (JP);
Yoshiyuki Furuya, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 634 days.

(21) Appl. No.: 11/129,300

(22) Filed: May 16, 2005

(65) Prior Publication Data
US 2005/0259034 A1  Nov. 24, 2005

(30) Foreign Application Priority Data
May 18, 2004 (JP) ............... 2004-147165

(51) Int. Cl.
*G09G 5/00* (2006.01)
(52) U.S. Cl. .................. 345/7; 345/8; 359/13; 359/630
(58) Field of Classification Search ...... 345/7, 345/8; 359/827, 13, 630
See application file for complete search history.

(56) References Cited

U.S. PATENT DOCUMENTS

| | | | |
|---|---|---|---|
| 3,816,005 A * | 6/1974 | Kirschner | 356/251 |
| 5,457,575 A * | 10/1995 | Groves et al. | 359/631 |
| 5,675,445 A * | 10/1997 | Uemura et al. | 359/827 |
| 5,677,701 A * | 10/1997 | Okuyama et al. | 345/7 |
| 5,905,477 A * | 5/1999 | Kuwayama et al. | 345/7 |
| 6,313,927 B1 * | 11/2001 | Kodaira | 358/487 |
| 6,504,518 B1 * | 1/2003 | Kuwayama et al. | 345/7 |

* cited by examiner

*Primary Examiner*—Sumati Lefkowitz
*Assistant Examiner*—Viet Pham
(74) *Attorney, Agent, or Firm*—Kratz, Quintos & Hanson, LLP

(57) ABSTRACT

A head-up display device includes a housing; a display unit accommodated in the housing for emitting a projected image; a reflector for reflecting the projected image passing through an opening in the housing toward an eye range of a vehicle driver. The head-up display device further includes a movable member attached movably to the housing, and the display unit is fixed on the movable member. A position of the projected image is adjusted by only moving the movable member.

2 Claims, 3 Drawing Sheets

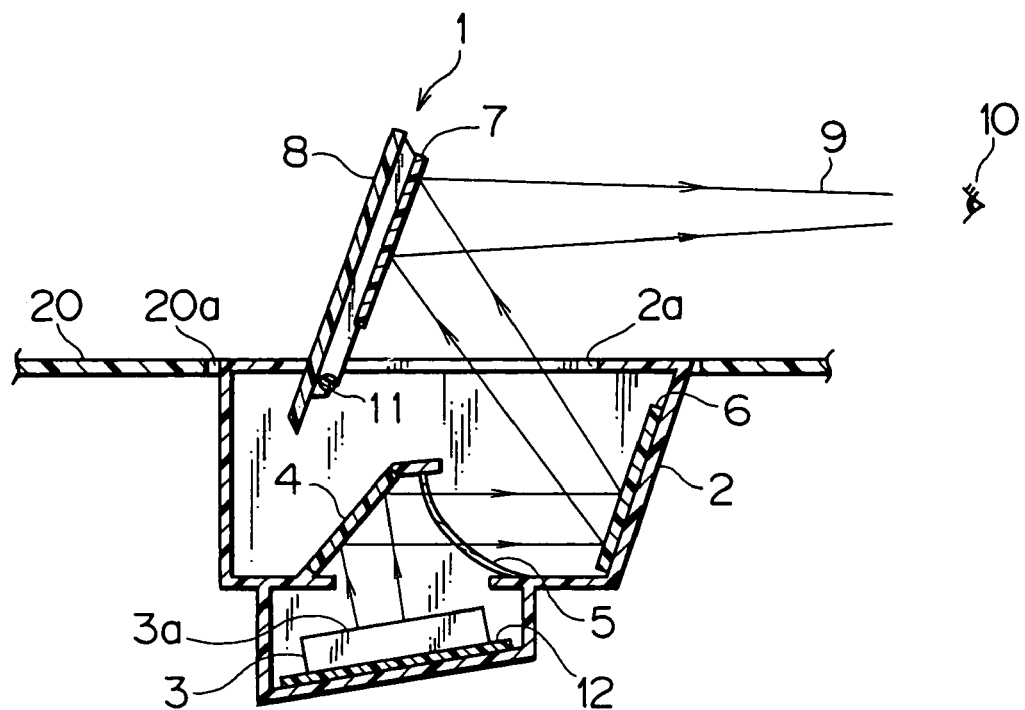
F I G. 1
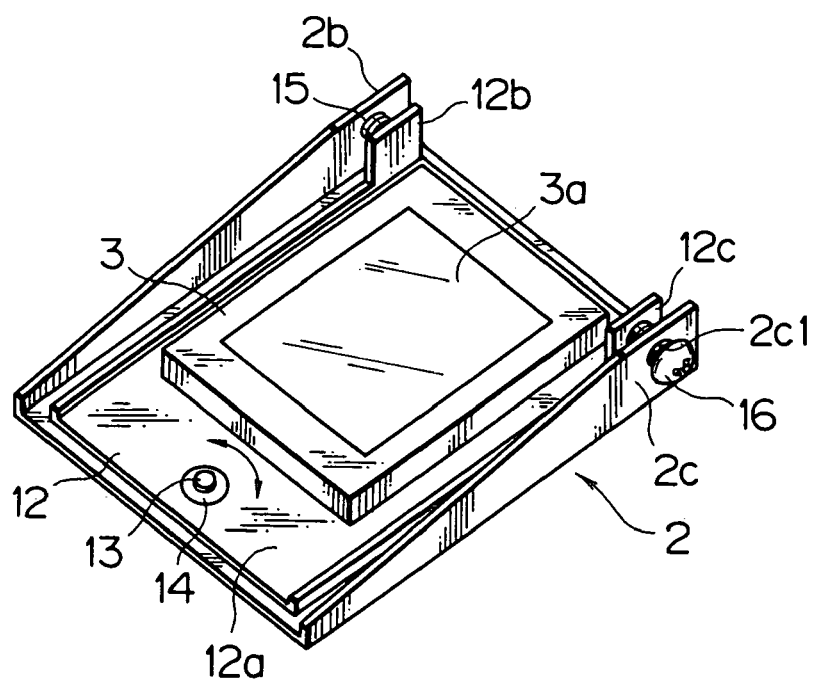
F I G. 2

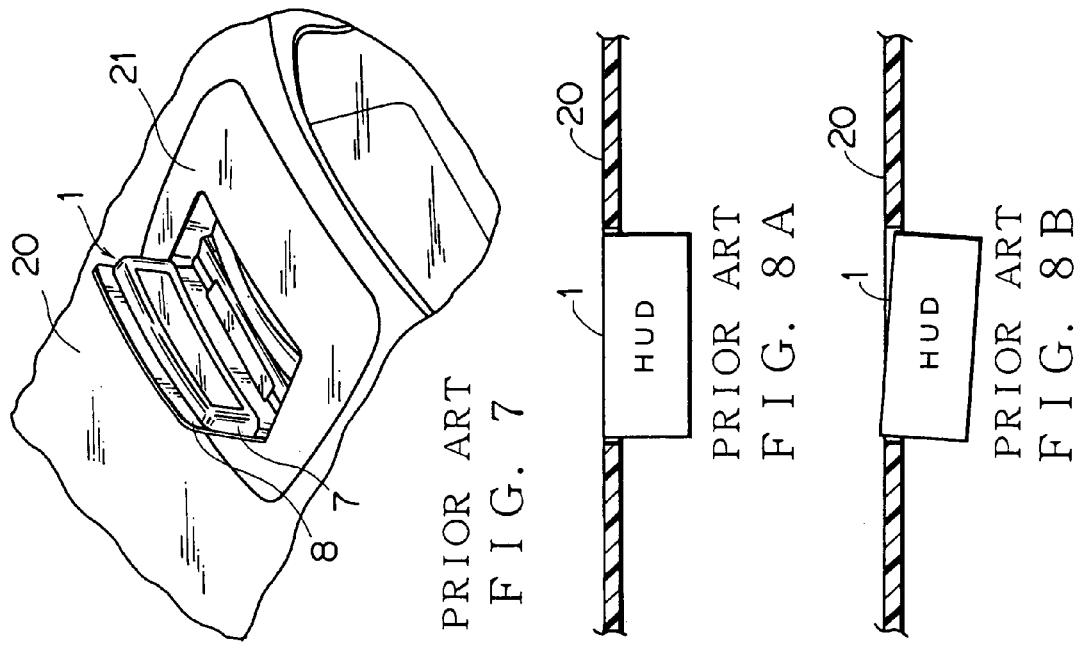
PRIOR ART
FIG. 7
PRIOR ART
FIG. 8A
PRIOR ART
FIG. 8B
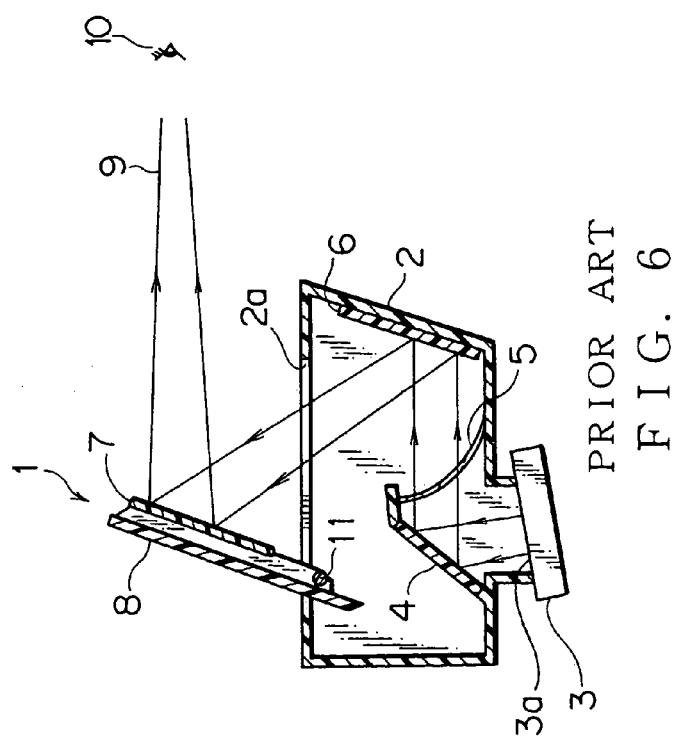
PRIOR ART
FIG. 6

HEAD-UP DISPLAY DEVICE

BACKGROUND OF THE INVENTION

The priority application claims priority of Japanese Patent Application No. 2004-147165, which is hereby incorporated by reference.

1. Field of the Invention

This invention relates to a head-up display device. In more detail, this invention relates to a head-up display device allowing a position of an projected image to be easy adjusted after the head-up display device is mounted on an instrument panel of a vehicle, and presenting a good appearance.

2. Description of the Related Art

FIG. 6 shows a schematic view showing a configuration of a conventional head-up display device (HUD). As shown in FIG. 6, the head-up display device 1 includes a housing 2, a display unit 3 attached to the housing 2, a first mirror 4, a front pane 5, a second mirror 6, a reflector 7, and a cover 8. A projected image 9 is emitted from a surface of the display unit 3 fixed on a bottom of the housing 2. Then, the projected image 9 is reflected by the first and second mirrors 4, 6. Then, the projected image 9 passes through an opening 2a opened on an upper wall of the housing 2, and is further reflected by the reflector 7. Then, the projected image 9 reaches an eye point 10 in an eye range of a vehicle driver.

For improving visibility of the projected image 9, the projected image 9 emitted from the display unit 3 is reflected and magnified by the reflector 7. Therefore, dimension and angle errors of optical parts are also magnified to affect the projected image 9 considerably. For preventing the errors, for example, all the optical parts are fixed on the housing 2 made of a rigid frame.

FIG. 7 shows an embodiment of the conventional head-up display device mounted on an instrument panel 20 of a vehicle. The head-up display device 1 is fixed on the instrument panel 20, and an instrument panel cover 21 covers a periphery of the head-up display device 1. As shown in. FIG. 8A, an upper wall of the cover 8 of the head-up display device 1 is so positioned to be flush with a surface of the instrument panel 20 when the cover 8 is closed. The large instrument panel 20 is made of synthetic resin. Therefore, tolerance of the instrument panel 20 is much larger than that of the head-up display device 1.

Accordingly, because the tolerance of the instrument panel 20, on which the head-up display device 1 is mounted, is large, even if the tolerance of the head-up display device 1 is reduced, the projected image 9 may be misaligned or tilted. For preventing the misalignment or the tilt, an angle adjustment mechanism is attached to a position where the head-up display device 1 is mounted on the instrument panel 20 for adjusting an angle of the mounted head-up display device 1. Thus, an erect image of the projected image 9 is obtained without any tilt.

However, in some cases, the head-up display device 1 is tilted, and the upper wall of the closed cover 8 is not flush with the surface of the instrument panel as shown in FIG. 8B. When the head-up display device 1 is tilted, a large gap exists between the surface of the instrument panel 20 and the head-up display device 1. Therefore, there is a problem that an appearance of the instrument panel 20 on which head-up display device 1 is mounted becomes worse.

Accordingly, it is an object of the present invention to provide a head-up display device that allows a position of a projected image to be adjusted easily after the head-up display device is mounted on an instrument panel of a vehicle, and presents a good appearance.

SUMMARY OF THE INVENTION

In order to attain the object, according to the present invention, there is provided a head-up display device including:
a housing;
a display unit accommodated in the housing for emitting a projected image;
a reflector for reflecting the projected image passing through an opening in the housing;
a movable member attached movably to the housing,
whereby the display unit is fixed on the movable member.

Preferably, the movable member includes a plane surface on which the display unit is fixed. One end of the movable member is supported by a supporting shaft protruding from the housing in such a manner as to be rotatable about the supporting shaft in a plane parallel to the plane surface the other end of the movable member is energized at one side wall thereof by a resilient member mounted on the housing in a plane parallel to the plane surface, and contacts a screw screwed through the housing at the other side wall thereof opposite to the one side wall.

The above and other objects, features, and advantages of the present invention will be better understood when taken in connection with the accompanying drawings and description.

BRIEF DESCRIPTION OF THE DRAWINGS

FIG. 1 is a schematic view showing a configuration of an embodiment of a head-up display device according to the present invention;

FIG. 2 is a partially perspective view of the head-up display device of FIG. 1;

FIG. 6 is a schematic view showing a configuration of an embodiment of a conventional head-up display device;

FIG. 7 is a schematic view showing an embodiment of the conventional head-up display device of FIG. 6 mounted on an instrument panel of a vehicle;

FIG. 8A is an explanatory view showing the head-up display device of FIG. 6 mounted on the instrument panel in a good condition; and FIG. 8B is an explanatory view showing the head-up display device of FIG. 6 mounted on the instrument panel in a bad condition.

DESCRIPTION OF THE PREFERRED EMBODIMENTS

Embodiment of the Present Invention

Figure 3:
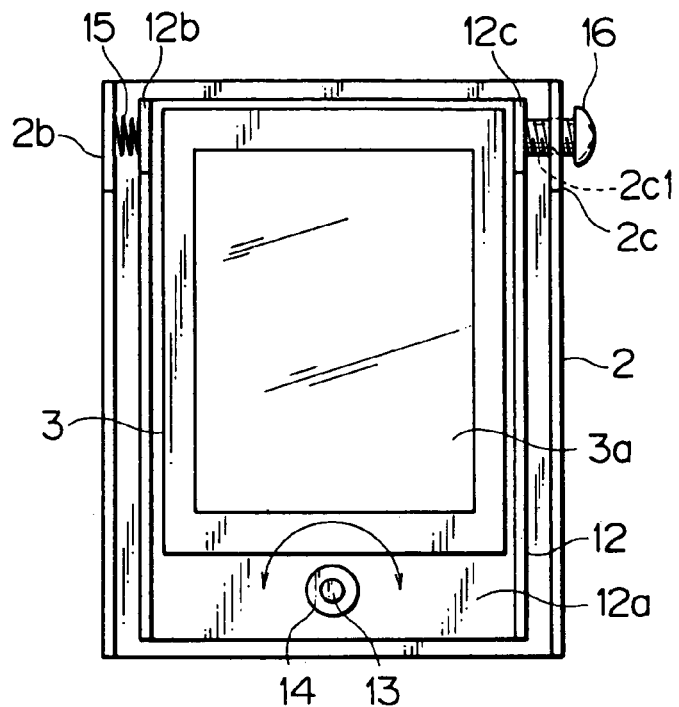
FIG. 3 is a partially plane view of the head-up display device of FIG. 2.

An embodiment of a head-up display device according to the present invention will be explained with reference to FIGS. 1 to 5.

As shown in FIG. 1, a head-up display device 1 (hereinafter referred to as "HUD") includes a housing 2, a display unit 3 attached to the housing 2, a first mirror 4, a front pane 5, a second mirror 6, a reflector 7, and a cover 8. The HUD 1 further includes a movable member 12 positioned in between the housing 2 and the display unit 3.

The housing 2 is, for example, made of black resin, formed in a box shape, and mounted on an instrument panel 20 of a vehicle. An opening 2a is opened in a substantially square shape on an upper wall of the housing 2 for passing the projected image from the display unit 3 through to the reflector 7.

The display unit 3 has a substantially rectangular parallelepiped shape, and is disposed on a bottom of the housing 2. The display unit 3 emits the projected image corresponding to images such as car navigation data from a substantially plane display unit surface 3a. For example, a vacuum fluorescent display unit or an LCD (liquid crystal display unit) with a back light is employed as the display unit 3.

The first mirror 4 is fixed on the housing 2 in such a manner as to reflect laterally the projected image projected obliquely upward from the display unit 3, for example, to reflect to the right of FIG. 1. The second mirror 6 is fixed opposite to the first mirror 4 on the housing 2 in such a manner as to reflect obliquely upward the projected image reflected by the first mirror 4, for example, to reflect to the upper left of FIG. 1. Each of the first and second mirrors 4, 6 is a total reflection mirror in a flat plate shape having reflectivity of equal to or more than 90%.

The front pane 5 is fixed on the housing 2 in between the first and second mirrors 4, 6. The front pane is made of, for example, acrylic sheet having transparency of about 90% in a flat plate or a slight concave shape for protecting the display unit 3 from such as dust.

The reflector 7 reflects laterally the projected image reflected by the second mirror 6 to a vehicle driver's eye point 10, for example, to the right of FIG. 1. The reflector 7 is made of, for example, a mirror or a hologram optical element. When the mirror is employed as the reflector 7, preferably, the reflector 7 has a concave shape for allowing the vehicle driver to look forward at a virtual image further away. The reflector is fixed to a rotating shaft 11 rotatably supported by the housing 2. The rotating shaft 11 is rotated by a not-shown motor and a not-shown transmission gear mechanism. Owing to the rotation of the rotating shaft 11, the head-up display device 1 is retractable so that the reflector 7 and the cover 8 can open and close the opening 2a. Incidentally, a half mirror is normally employed as the reflector 7 for looking at the virtual image superimposed on a front view out of the vehicle. However, in this embodiment, a total reflection mirror is employed as the reflector 7.

As shown in FIGS. 2 and 3, the movable member 12 is a plate member having a plane surface 12a in a substantially rectangular shape, and disposed on a bottom of the housing 2. The display unit 3 is attached to the plane surface 12a. A not-shown fixing member such as an adhesive fixes a back wall of the display unit 3 on the plane surface 12a. Incidentally, the housing 2 has a substantially box shape as shown in FIG. 1, however, for explaining a shape of the movable member 12, the housing is shown in partially sectional views of FIGS. 2 and 3.

One end of the movable member 12 is supported by a supporting shaft 13 protruding from the housing 2 in such a manner as to be rotatable about the supporting shaft 13 in a plane parallel to the plane surface 12a. For preventing removal of the movable member 12 from the supporting shaft 13, a lock washer 14 is disposed between a top of the supporting shaft 13 and the plane surface 12a.

A coil spring 15 energizes one side wall 12b of the other end of the movable member 12 in a plane parallel to the plane surface 12a. A screw 16 and screwed into a screw hole 2c1 opened in the housing 2 contacts the other side wall 12c opposite to the one side wall 12b of the other end of the movable member 12.

When mounted on the instrument panel 20 of the vehicle, the head-up display device 1 is positioned below an opening 20a opened in the instrument panel 20. Further, the head-up display device 1 is fixed on the instrument panel 20 in such a manner that an upper wall of the head-up display device 1 is flush with a surface of the instrument panel 20 when the cover 8 is closed. The projected image 9 emitted from the display unit 3 is reflected by the first mirror 4 and then reflected by the second mirror 6. Then, the projected image 9 passes through an opening 2a opened on an upper wall of the housing 2, and is further reflected by the reflector 7. Then, the projected image 9 reaches an eye point 10 in an eye range of a vehicle driver as an image.

When the image seen from the eye point 10 of the vehicle driver is not an erect image, but a tilted image, the image is allowed to become erect by only adjusting a position of the display unit 3. Namely, since adjusting a position of the whole head-up display device 1 is difficult as described above in the prior art, the tilted image is adjusted by only adjusting the position of the display unit 3 according to the present invention. Thus, the erect image without any angle error seen from the eye point 10 of the vehicle driver is obtained.

An adjustment method of the position (angle) of the display unit 3 will be explained in detail. The movable member 12 rotatably supported by the supporting shaft 13 of the housing 2 is energized at the side wall 12c to be rotated by screwing the screw 16 through the screw hole 12c1. Thus, the position of the plane surface 12a is shifted relative to the housing 2 according to a movement of the screw 16. The coil spring 15 energizes the other side wall 12b opposite to the side wall 12c of the movable member 12 in a direction opposite to an energizing direction of the screw 16. Thus, the plane surface 12a of the movable member 12 energized by the screw 16 is stabilized, and allows a position adjustment of the plane surface 12a.

Figure 4:
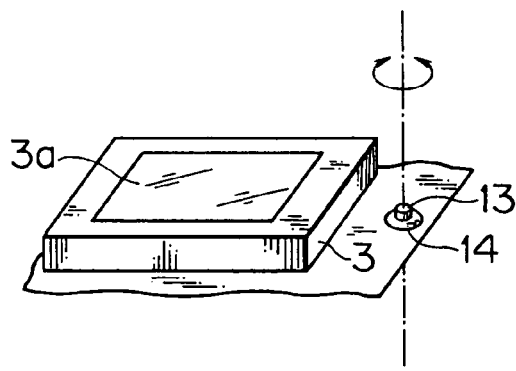
FIG. 4 is an explanatory view showing a position adjustment of a display unit according to the present invention.

Accordingly, as shown in FIG. 4, by adjusting the position of the plane surface 12a, the position of the display unit 3 mounted on and fixed on the plane surface 12a also is adjusted by being rotated about the supporting shaft 13.

Figure 5:
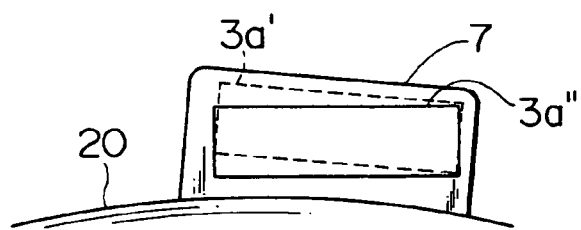
FIG. 5 is an explanatory view showing projected images before and after the position adjustment of the display unit.

Resultingly, as shown in FIG. 5, an unadjusted image 3a' seen tilted from the eye point 10 is adjusted to be an erect adjusted image 3a".

According to the present invention, the head-up display device allows a tilted image tilted after the head-up display device being mounted on the instrument panel of a vehicle, to be corrected by only rotating the movable member without adjusting the position of the whole head-up display device. Therefore, the upper wall of the head-up display device, being flush with the surface of the instrument panel of a vehicle when mounted on a vehicle, is still flush with the surface of the instrument panel after adjusting the tilted image to be erect. Therefore, a head-up display device allowing an easy position adjustment of a projected image when mounted on an instrument panel of a vehicle, and presenting a good appearance is obtained. Further, according to the easy adjustment of the head-up display device, assembling workability in an automobile manufacturing plant is improved.

Having now fully described the present invention, it will be apparent to one of ordinary skill in the art that many changes and modifications can be made thereto without departing from the scope of the invention as set forth herein.

What is claimed is:

1. A head-up display device comprising:
   a housing having a bottom, and an upper wall with an opening therein;
   a display unit accommodated in the housing and disposed at the bottom for emitting a projected image;
   a reflector for reflecting the projected image passing through the opening in the upper wall in the housing; and
   a movable member attached movably within the housing,
   where only the display unit of the head-up display device is fixed on the movable member at the bottom of the housing.

2. The head-up display device as claimed in claim 1,
   wherein the movable member includes a plane surface on which the display unit is fixed,
   wherein one end of the movable member is supported by a supporting shaft protruding from the housing in such a manner as to be rotatable about the supporting shaft in a plane parallel to the plane surface, and
   wherein the other end of the movable member is energized at one side wall thereof by a resilient member mounted on the housing in a plane parallel to the plane surface, and contacts a screw screwed through the housing at the other side wall thereof opposite to the one side wall.

* * * * *